(No Model.)
E. WARNE.
ANTI-FRICTION BEARING.
No. 386,172. Patented July 17, 1888.
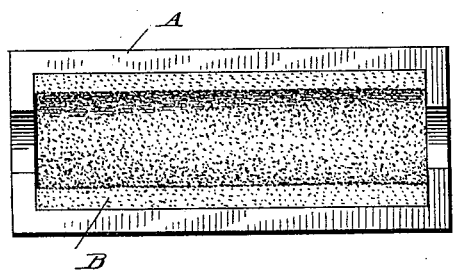
WITNESSES.
Edwin T. Yewell
Ewell A. Dick
INVENTOR.
Elijah Warne
By Marcellus Bailey,
Attorney.

UNITED STATES PATENT OFFICE.

ELIJAH WARNE, OF EASTON, PENNSYLVANIA, ASSIGNOR OF ONE-HALF TO MARSHALL T. B. DAVIDSON, OF NEW YORK, N. Y.

ANTI-FRICTION BEARING.

SPECIFICATION forming part of Letters Patent No. 386,172, dated July 17, 1888.

Application filed Sepember 20, 1887. Serial No. 250,247. (No model.)

*To all whom it may concern:*

Be it known that I, ELIJAH WARNE, of Easton, in the county of Northampton and State of Pennsylvania, have invented a new and useful Improvement in Anti-Friction Bearings, of which the following is a specification.

My invention has for its object the production of an anti-friction bearing which shall be strong and durable, and at the same time be little liable to heat when in use. The materials which I use for the purpose are more particularly intended to be used as a lining for journal-boxes and other bearings, although they may be used not only for the lining merely, but also to form the box itself.

The particular composition of matter or material which I have devised for the purpose consists, essentially, of graphite and gluten, to which may be added, if desired, what I term a "filler" or "body material"—for example, Indian red, ultramarine blue, white and red lead, Vandyke brown, &c., or paper, wood, or leather pulp, and other suitable substances—as, for instance, a small percentage of starch; but this is not at all essential. This composition, taken in the condition of a stiff paste, is molded into form desired and dried, being subjected, preferably, to successive pressures at intervals during the drying operation, so that it may, when entirely dry or baked, be a compact, close-textured, and strong body without the cracks or porosity which would otherwise result.

Gluten is an article which can be obtained in the market. I prefer for the purposes of my invention to obtain it from the hard spring-wheat flour grown in the northwestern portions of the United States, separating the gluten therefrom in any suitable manner. For instance, make the flour into a stiff dough, place the same on a sieve or screen, and there subject it—while continually kneading it—to the action of a jet of water. The effect of this operation will be to wash out the starch, thus leaving on the screen a mass which is nearly all gluten. Take the raw gluten thus obtained and boil it, adding sufficient water for the purpose, using as little as possible—in fact, just about enough to give the mass the consistence of a stiff paste. The result of this operation is that the gluten forms a heavy, tough, and elastic gum, which, when dry, is horn-like and hard and is admirably adapted, by reason of its non-heating and durable properties, for use in anti-friction bearings, &c.

In making anti-friction linings or bearings I take the gluten when of the stiff pasty consistence above referred to—about the consistence of mush, for instance. In this condition I intimately mix it with the graphite or the graphite and filler, so as to form the same into a thoroughly homogeneous mass, using for this mixing operation any of the well-known kinds of apparatus for mixing paints with oils, or putty-mixers or paint-mills, &c. The proportions in which the ingredients are taken may vary considerably. If gluten and graphite alone be used, about two parts, by measure, of graphite to one part, by measure, of gluten will give excellent results. In case a substance of the character termed by me a "filler" be added, I have found that good results can be obtained if in seven parts, by measure, I take two parts of gluten, two parts filler, and three parts graphite.

The composition can readily be molded and pressed into the form required.

In the accompanying drawings is shown one-half of a journal-box lined with the composition, A being the box, and B the lining. The composition lining is molded into place and shape under heavy pressure, and it is then subjected to drying heat in any suitable oven. In order, however, to render the lining close-textured, compact, and hard, it will be found desirable to subject the same to pressure at intervals during the drying operation, so that it shall not be liable to have a body which, owing to the evaporation due to the drying operation, may have cracks in it or may in spots be of spongy or porous structure. The intermittent pressures above referred to correct any such tendency, the lining when dry and in finished condition being entirely solid and very durable and resistent. The gluten is virtually the binder which holds the ingredients together, and by reason of its inherent strength, as well as the non-heating properties which I find it possesses, it very greatly enhances the efficiency of the lining or bearing. I have found, for example, that with a box having my composition, the bearing-surface being eight inches in length and the shaft (a two-and-three-sixteenths-inch shaft) revolving in contact therewith at from three to four hundred revolutions per minute, the composition will show an increase in heat above that of the surrounding atmosphere of 4° Fahrenheit only. This result I believe to be due to the gluten which is used in conjunction with the graphite.

I am aware that various compositions of matter have been devised for anti-friction journal-bearings—such, for instance, as mica in conjunction with starch or flour and gum-arabic or other cement, graphite in conjunction with albumen or other size and fibrous material, or with paraffine, hair, ivory-dust, &c. I am also aware that perforated metal plates have been coated with a composition consisting of plumbago and flour paste or rubber cement. I claim none of these things; but What I do claim herein as new and of my own invention is—

A molded or pressed anti-friction composition bearing consisting, essentially, of gluten and graphite, substantially as hereinbefore set forth.

In testimony whereof I have hereunto set my hand this 1st day of September, 1887.

ELIJAH WARNE.

Witnesses:
EWELL A. DICK,
MARVIN A. CUSTIS.